(12) United States Patent
Lee

(10) Patent No.: US 10,268,079 B2
(45) Date of Patent: Apr. 23, 2019

(54) DISPLAY DEVICE AND OPTICAL SHEET USED IN SAME

(71) Applicant: AU OPTRONICS CORPORATION, Hsin-chu (TW)

(72) Inventor: Seok-Lyul Lee, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/915,624

(22) Filed: Mar. 8, 2018

(65) Prior Publication Data

US 2018/0267366 A1    Sep. 20, 2018

(30) Foreign Application Priority Data

Mar. 20, 2017  (TW) .............................. 106109216 A

(51) Int. Cl.
*G02F 1/1335* (2006.01)

(52) U.S. Cl.
CPC .. *G02F 1/133621* (2013.01); *G02F 1/133528* (2013.01); *G02F 2001/133614* (2013.01); *G02F 2202/36* (2013.01)

(58) Field of Classification Search
CPC .................. G02F 1/133528; G02F 1/133621
See application file for complete search history.

(56) References Cited

U.S. PATENT DOCUMENTS

2014/0285995 A1\* 9/2014 Ray et al. ................. F21K 9/56
                                                              362/84
2015/0185381 A1   7/2015 Wu et al.
(Continued)

FOREIGN PATENT DOCUMENTS

CN    105242448 A    1/2016
TW    201526222 A    7/2015
(Continued)

OTHER PUBLICATIONS

Office Action issued by (TIPO) Intellectual Property Office, Ministry of Economic Affairs, R. O. C. dated Aug. 28, 2017 for Application No. 106109216, Taiwan.

*Primary Examiner* — Thomas M Sember

(74) *Attorney, Agent, or Firm* — Locke Lord LLP; Tim Tingkang Xia, Esq.

(57) ABSTRACT

A display device includes a display panel, a backlight module, an optical sheet, and a polarizer. The display panel includes a plurality of first-color sub-pixels, a plurality of second-color sub-pixels, and a plurality of third-color sub-pixels. The backlight module includes a blue light source. The optical sheet includes a substrate, a plurality of transparent bumps, and a photo-excitation layer. The transparent bumps are overlapped with the third-color sub-pixels in a vertical projecting direction. The photo-excitation layer includes first photo-excitation regions which are overlapped with the first-color sub-pixels in the vertical projecting direction, and second photo-excitation regions which are overlapped with the second-color sub-pixels in the vertical projecting direction. Each of the first photo-excitation regions and the second photo-excitation regions has a plurality of first-color quantum dots and a plurality of second-color quantum dots. The polarizer is between the display panel and the optical sheet.

13 Claims, 6 Drawing Sheets

(56) References Cited

U.S. PATENT DOCUMENTS

| | | |
|---|---|---|
| 2015/0228232 A1 | 8/2015 | Lee et al. |
| 2016/0116801 A1 | 4/2016 | Fan et al. |
| 2017/0255056 A1 | 9/2017 | Liu |
| 2017/0269274 A1* | 9/2017 | Cheng et al. ............ G02B 5/30 362/84 |

FOREIGN PATENT DOCUMENTS

| | | |
|---|---|---|
| TW | 201616191 A | 5/2016 |
| TW | M526079 U | 7/2016 |

* cited by examiner

DISPLAY DEVICE AND OPTICAL SHEET USED IN SAME

CROSS-REFERENCE TO RELATED PATENT APPLICATION

This non-provisional application claims priority to and the benefit of, pursuant to 35 U.S.C. § 119(a), patent application Serial No. 106109216 filed in Taiwan on Mar. 20, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a display technology, and in particular, to a display device and an optical sheet used in same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light emission efficiency is an indicator for evaluating energy-saving of a display device. The light emission efficiency of a display device is usually indicated by using a percentage obtained by dividing light emission intensity of a display panel of the display device by light emission intensity of a backlight module of the display device. Generally, a liquid crystal display device includes a display panel and a backlight module, and the display panel usually includes structures such as a substrate, a switch component array, liquid crystal, a color filter, and a polarizer. After light rays emitted from the backlight module pass through structures, such as the substrate, the switch component array, the liquid crystal, the color filter, and the polarizer, of the display panel, actual intensity of light rays output by the display panel is attenuated to 3% to 5% of intensity of the light rays emitted from the backlight module, that is, the light emission efficiency is only 3% to 5%. To achieve necessary brightness during display, a backlight module with higher light emission intensity needs to be used in a display device, which is thus more energy-consuming.

In addition, for an existing liquid crystal display device, by comparing a spectrum of a light ray emitted from a display panel with a spectrum of a light ray emitted from a backlight module, it could be found that for three primary colors, namely, red, green, and blue, a light ray emitted from the display panel has relatively large full width at half maximum and a relatively low peak value in a red band and a green band. As a result, the chroma of liquid crystal display device is worse than the chroma standard of the National Television System Committee (NTSC). An existing liquid crystal display device usually only achieves 72% of the NTSC standard and is inferior to a conventional cathode-ray tube television in terms of presentation of colors.

SUMMARY

To resolve the problem faced by the prior art, the present invention relates to a display device and an optical sheet used in same, so as to improve light emission efficiency and/or chroma of the display device.

In an embodiment, a display device includes a display panel, a backlight module, an optical sheet, and a polarizer. The display panel includes a plurality of first-color sub-pixels, a plurality of second-color sub-pixels, and a plurality of third-color sub-pixels. The backlight module includes a blue light source. The optical sheet is located between the display panel and the backlight module, and the optical sheet includes a substrate, transparent bumps, and a photo-excitation layer. The transparent bumps are disposed on the substrate in a spaced manner, and each of the transparent bumps is overlapped with one of the third-color sub-pixels in a vertical projecting direction. The photo-excitation layer is located on the substrate and located between the transparent bumps. The photo-excitation layer includes a plurality of first photo-excitation regions and a plurality of second photo-excitation regions. Each of the first photo-excitation regions is overlapped with one of the first-color sub-pixels in the vertical projecting direction, and each of the second photo-excitation regions is overlapped with one of the second-color sub-pixels in the vertical projecting direction. Each of the first photo-excitation regions and the second photo-excitation regions includes a plurality of first-color quantum dots and a plurality of second-color quantum dots. The polarizer is located between the display panel and the optical sheet.

In an embodiment, an optical sheet includes a substrate, transparent bumps, and a photo-excitation layer. The transparent bumps are disposed on the substrate in a spaced manner. The photo-excitation layer is located on the substrate and located between the transparent bumps. The photo-excitation layer includes a plurality of first-color quantum dots and a plurality of second-color quantum dots, and the height of the transparent bumps is substantially the same as the height of the photo-excitation layer.

In conclusion, according to the display device and the optical sheet used in same in the present invention, a photo-excitation layer including first-color quantum dots and second-color quantum dots is designed in the optical sheet thereof to correspond to first-color sub-pixels and second-color sub-pixels, and first-color light and second-color light that are generated after exciting the first-color quantum dots and the second-color quantum dots by light are provided to first-color sub-pixels and second-color sub-pixels, so as to improve light emission efficiency and chroma of the display device, thereby further achieving a power-saving function.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
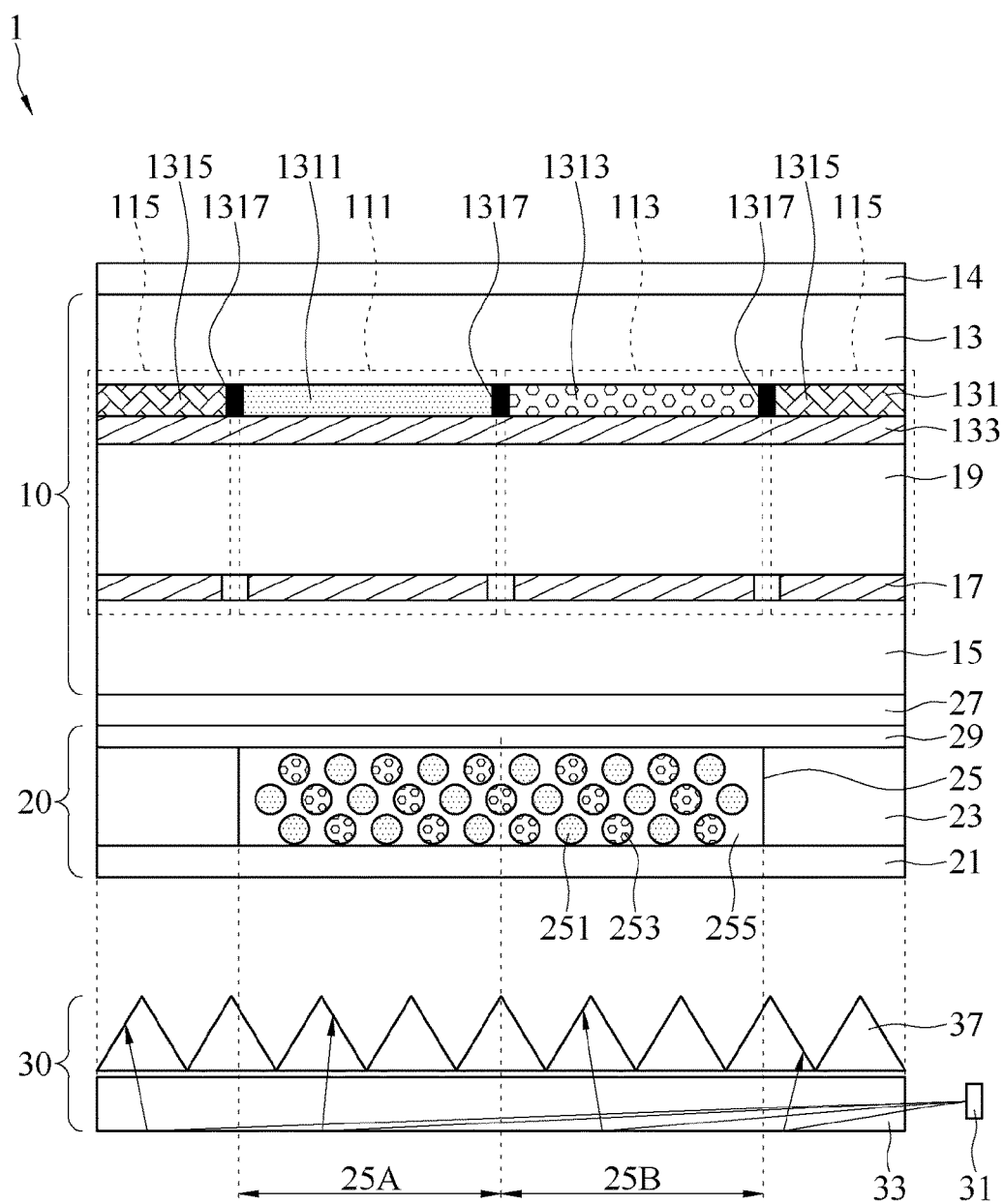
FIG. 1 is a sectional view of a display device of a first embodiment.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a sectional view of a display device of a first embodiment. Referring to FIG. 1, a display device 1 includes a display panel 10, an optical sheet 20, and a backlight module 30. The optical sheet 20 is located between the display panel 10 and the backlight module 30.

The display panel 10 includes a plurality of first-color sub-pixels 111, a plurality of second-color sub-pixels 113, and a plurality of third-color sub-pixels 115. The backlight module 30 includes a blue light source 31.

The optical sheet 20 includes a substrate 21, a plurality of transparent bumps 23, and a photo-excitation layer 25. The transparent bumps 23 are disposed on the substrate 21 in a spaced manner, and each of the transparent bumps 23 is overlapped with one of the third-color sub-pixels 115 in a vertical projecting direction, that is, a vertical projection of the transparent bump 23 to the display panel 10, of the substrate 21. That is, a light emission surface of a transparent bump 23 is aligned with a light incident surface of a third-color sub-pixel 115. The photo-excitation layer 25 is located on the substrate 21 and located between the transparent bumps 23. That is, the photo-excitation layer 25 and the transparent bumps 23 are located on a same surface of the substrate 21. The photo-excitation layer 25 includes a plurality of first photo-excitation regions 25A and a plurality of second photo-excitation regions 25B. Each of the first photo-excitation regions 25A is overlapped with one of the first-color sub-pixels 111 in the vertical projecting direction of the substrate 21, and each of the second photo-excitation regions 25B is overlapped with one of the second-color sub-pixels 113 in the vertical projecting direction of the substrate 21. That is, a light emission surface of a first photo-excitation region 25A is aligned with a light incident surface of a first-color sub-pixel 111, and a light emission surface of a second photo-excitation region 25B is aligned with a light incident surface of a second-color sub-pixel 113.

Herein, each of the first photo-excitation regions 25A and the second photo-excitation regions 25B includes a plurality of first-color quantum dots 251 and a plurality of second-color quantum dots 253. That is, the first photo-excitation regions 25A include both of the first-color quantum dots 251 and the second-color quantum dots 253, and the second photo-excitation regions 25B also include both of the first-color quantum dots 251 and the second-color quantum dots 253.

Further, the display device 1 may further include a polarizer 27, located between the display panel 10 and the optical sheet 20. The polarizer 27 can deflect a light ray that is emitted from the backlight module 30 and that passes through the optical sheet 20 to a particular direction and then, make the light ray enter the display panel 10.

In this embodiment, the display panel 10 includes a first substrate 13, a second substrate 15, a pixel array 17, and a liquid crystal layer 19. The liquid crystal layer 19 is located between the first substrate 13 and the second substrate 15, and the pixel array 17 is located between the second substrate 15 and the liquid crystal layer 19. A color filter layer 131 is disposed between the first substrate 13 and the liquid crystal layer 19. The color filter layer 131 includes a first-color resist layer 1311, a second-color resist layer 1313, and a third-color resist layer 1315. Between the first-color resist layer 1311, the second-color resist layer 1313, and the third-color resist layer 1315, and the liquid crystal layer 19, a common electrode 133 may be further disposed, or another film layer may be disposed according to a requirement. The first color sub-pixels 111 include the first-color resist layer 1311 and regions of the pixel array 17 and the liquid crystal layer 19 that correspond to the first-color resist layer 1311. The second color sub-pixels 113 include the second-color resist layer 1313 and regions of the pixel array 17 and the liquid crystal layer 19 that correspond to the second-color resist layer 1313. The third color sub-pixels 115 include the third-color resist layer 1315 and regions of the pixel array 17 and the liquid crystal layer 19 that correspond to the third-color resist layer 1315. The pixel array 17 includes a plurality of pixel electrodes and a plurality of switch components, signal lines, and the like that are coupled to the pixel electrodes.

In some embodiments, the display device 1 further includes a polarizing plate 14, and the polarizing plate 14 is located on the first substrate 13. The polarizing plate 14 and the color filter layer 131 are respectively located on two opposite sides of the first substrate 13 and are used to deflect light emitted from the display panel 10 to a particular direction.

After blue light is emitted from the backlight module 30 and passes through the optical sheet 20 and the substrate 21, the blue light enters the first photo-excitation regions 25A, the second photo-excitation regions 25B, and the transparent bumps 23 respectively, the blue light that passes through the first photo-excitation regions 25A and second photo-excitation regions 25B excites the first color quantum dots 251 and the second color quantum dots 253, to generate first-color light and second-color light, and the blue light incident on the transparent bumps 23 directly passes through the transparent bumps 23. The first-color light and the second-color light enters the display panel 10 through light incident surfaces of the first color sub-pixels 111 and the second color sub-pixels 113, the first-color light passes through the first-color resist layer 1311 and is emitted from the light emission surface of the first color sub-pixels 111, and the second-color light passes through the second-color resist layer 1313 and is emitted from the light emission surface of the second color sub-pixels 113. After incidence of the blue light through the light incident surface of the third color sub-pixels 115, the blue light passes through the third-color resist layer 1315 to generate third-color light. The first-color light, the second-color light, and the third-color light are further mixed into to-be-displayed light of different colors.

In addition, black matrix layers 1317 are disposed between the first-color resist layer 1311 and the second-color resist layer 1313, between the second-color resist layer 1313 and the third-color resist layer 1315, and between the first-color resist layer 1311 and the third color resist layer 1315, to avoid problems of light leak and color mixing.

In this way, the blue light source 31 can provide a light ray with higher energy than that provided by a conventional white light source, and when the light ray enters the first photo-excitation regions 25A and second photo-excitation regions 25B, the light ray can excite the first color quantum dots 251 and the second color quantum dots 253 therein to generate first-color light and second-color light. Herein, upon spectrum analysis on light rays output by the first photo-excitation region 25A and the second photo-excitation regions 25B, as compared with a conventional liquid crystal display device, the first-color light and the second-color light therein have relatively small full width at half maximum and a relatively high peak value.

In some embodiments, the foregoing first color, second color, and third color are colors different from each other, and the first color and the second color are not blue color.

In some embodiments, the first color sub-pixels 111, the second color sub-pixels 113, and the third color sub-pixels 115 respectively represent red sub-pixels, green sub-pixels, and blue sub-pixels. The first color quantum dots 251 and the second color quantum dots 253 may be respectively red quantum dots and green quantum dots. The first-color light and the second-color light that are respectively generated by the first color quantum dots 251 and the second color quantum dots 253 that are excited by light rays output from the backlight module 30 may be respectively a red light ray and a green light ray. The third-color light may be blue light. The description herein is merely an embodiment. Any other quantum dot and color resist combinations of white light that can be formed by combination may serve as embodiments.

The first color quantum dots 251 and the second color quantum dots 253 are made of multi-layer nano semiconductor materials synthesized from zinc selenide (ZnSe), cadmium sulphide (CdS), cadmium selenide (CdSe), zinc sulfide (ZnS), and elements such as sulphur, selenium, and cadmium. For example, a quantum dot includes two layers, namely, an inner layer and an outer layer, the inner layer is cadmium selenide (CdSe), and the outer layer is zinc sulfide (ZnS). Emission of light of different colors may be controlled by controlling a particle size of a nano semiconductor material. The foregoing materials are merely used as embodiments, and no limitation is imposed herein. Further, the nano semiconductor material may also be synthesized into a pillar shape.

In some embodiments, the transparent bumps 23 may be only made of a transparent material, that is, the transparent bumps 23 do not include first color quantum dots 251 and second color quantum dots 253. For example, the transparent bumps 23 do not include any quantum dot. The description herein is merely an embodiment and is not used for limitation. In some embodiments, the transparent bumps 23 may also include third color quantum dots and output third-color light by exciting the third color quantum dots. In some embodiments, the blue light source 31 may be replaced by a violet light source, an ultraviolet light source, or the like, to improve efficiency of exciting the first color quantum dots 251 and the second color quantum dots 253.

Figure 2:
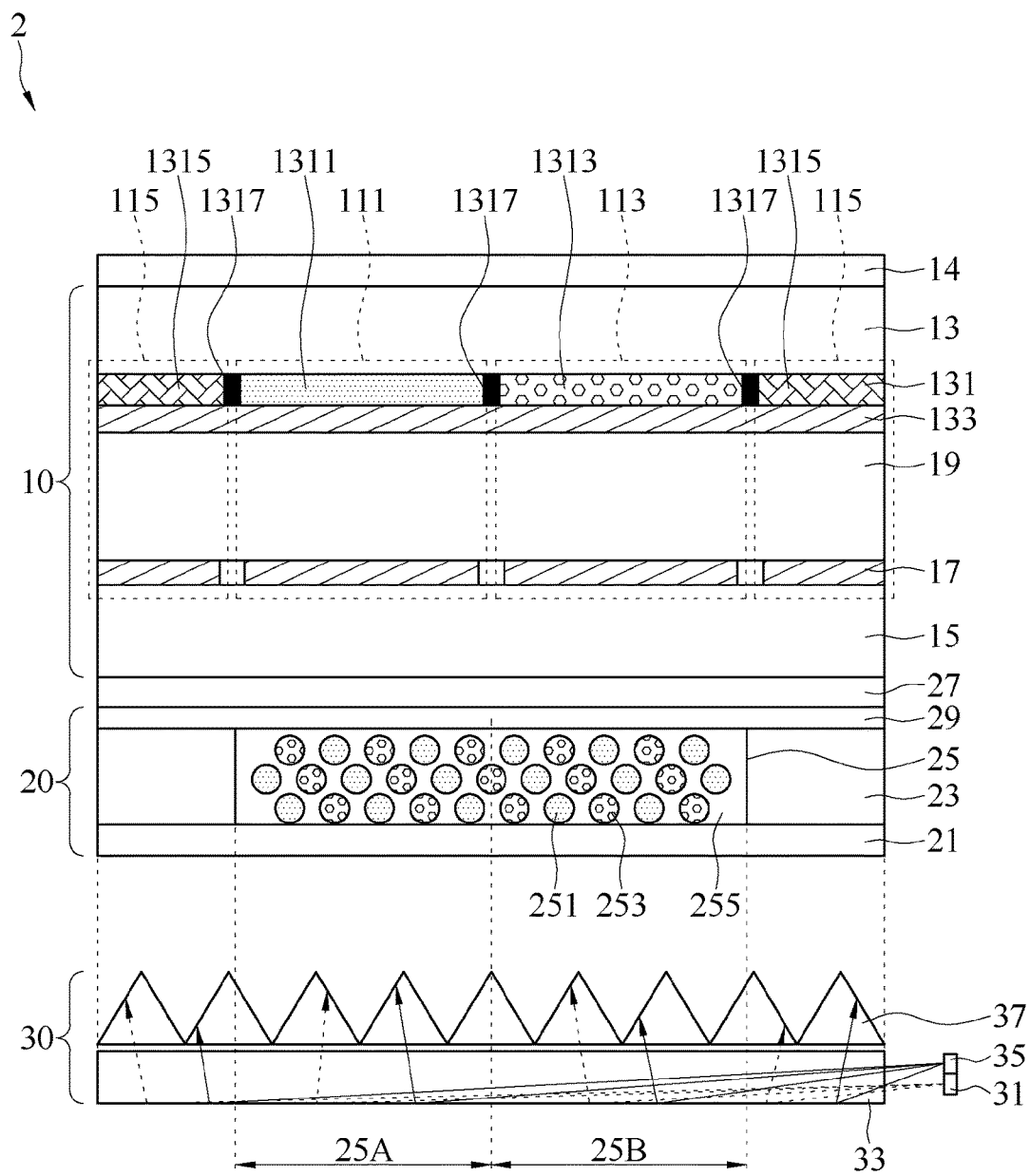
FIG. 2 is a sectional view of a display device of a second embodiment.

FIG. 2 is a sectional view of a display device of a second embodiment. Referring to FIG. 2, in some embodiments, in order to adjust a color temperature, a backlight module 30 in a display device 2 may further include a yellow light source 35. Herein, a yellow light ray emitted from the yellow light source 35 is mixed with blue light emitted from a blue light source 31, so that light rays output from the backlight module 30 are closer to warm colors. In some embodiments, a light source of the backlight module 30 may be implemented as a light-emitting diode (LED). That is, the blue light source 31 includes a plurality of blue LEDs. The yellow light source 35 includes at least one yellow LED. When both of the blue light source 31 and the yellow light source 35 are disposed, a ratio of the number of blue LEDs to the number of yellow LEDs may range from 2:1 to 20:1. However, no limitation is imposed herein.

Herein, a wavelength of the blue light ray emitted from the blue light source 31 ranges from approximately 380 to 490 nm. A wavelength of the yellow light ray emitted from the yellow light source 35 ranges from approximately 570 to 610 nm.

No matter whether, as in the first embodiment, the blue light source 31 is used in the backlight module 30, or, as in the second embodiment, both of the blue light source 31 and the yellow light source 35 are used, the transmissivity of the light rays output from the backlight module 30 through the transparent bumps 23 ranges from approximately 60% to 99%, preferably, 80% to 99%. In some embodiments, the transparent bumps 23 include at least one of poly(methyl methacrylate) (PMMA), epoxy resin, polyethylene terephthalate (PET), and PolyVinyl Chloride (PVC).

In FIG. 1 and FIG. 2, the backlight module 30 is an edge-type backlight module. In addition to the light source, that is, the blue light source 31 or/and the yellow light source 35, the backlight module 30 may further include a light guide plate 33. The light guide plate 33 can guide a light ray output from a light source on a side edge to the display panel 10. Besides, in this embodiment, the backlight module 30 may further include a collimation film 37 that is disposed between the light guide plate 33 and an optical film 20 and that provides a relatively collimated light source into the optical film 20, so make a display effect better. The description herein is merely an embodiment, and no limitation needs to be imposed. For example, a direct-type backlight module may also be used as the backlight module 30.

Figure 3A:
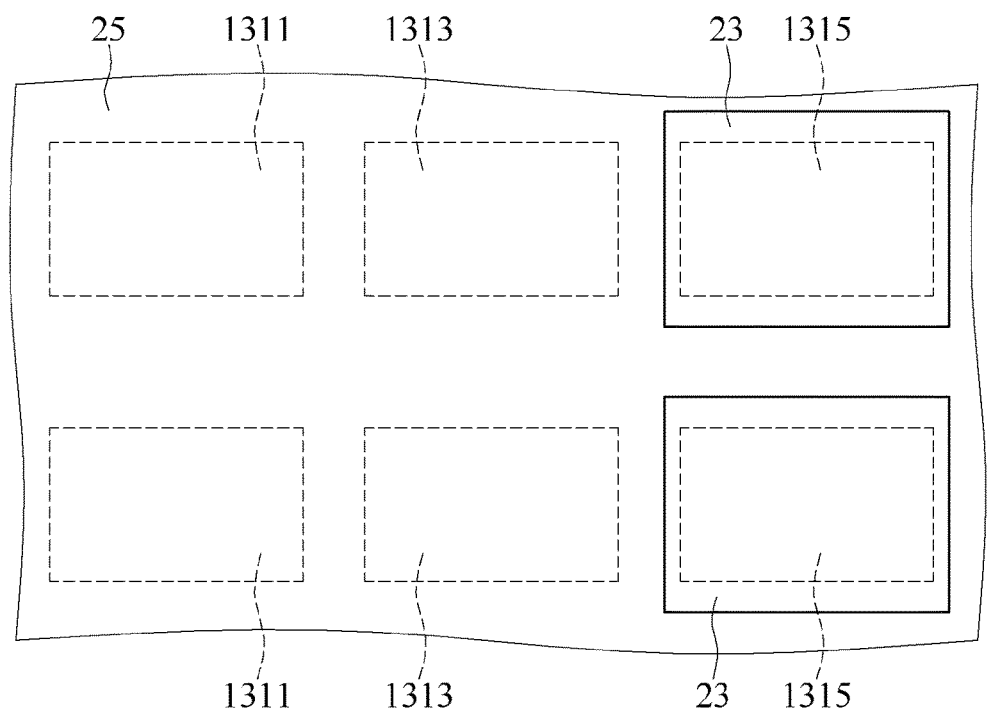
FIG. 3A is a schematic diagram of a local projection of a display panel to an optical sheet in FIG. 1 or FIG. 2.

FIG. 3A is a schematic diagram of a local projection of a display panel 10 to an optical sheet 20 in FIG. 1 or FIG. 2. Referring to FIG. 3A, positions of vertical projections of the first-color resist layer 1311, the second-color resist layer 1313, and the third-color resist layer 1315 to the optical sheet 20 are respectively indicated by using dashed lines, and the transparent bumps 23 are presented by using solid lines. As shown in FIG. 3A, the area of the transparent bumps 23 is greater than or equal to the area of the overlapped third-color resist layer 1315 in the vertical projecting direction of the substrate 21. In other words, a light emission surface of the transparent bumps 23 is greater than a light incident surface of the third sub-pixel layer 115.

In some embodiments, referring to FIG. 1 again, in the vertical projecting direction of the substrate 21, some of the transparent bumps 23 whose area is greater than the area of the third-color resist layer 1315 are located below the black matrix layer 1317, that is, are overlapped with the black matrix layer 1317. Therefore, the blue light ray is shielded by the black matrix layer 1317, and will not emerge or cause light leak and light mixing, so as to prevent an impact on imaging of the display device 1.

Figure 3B:
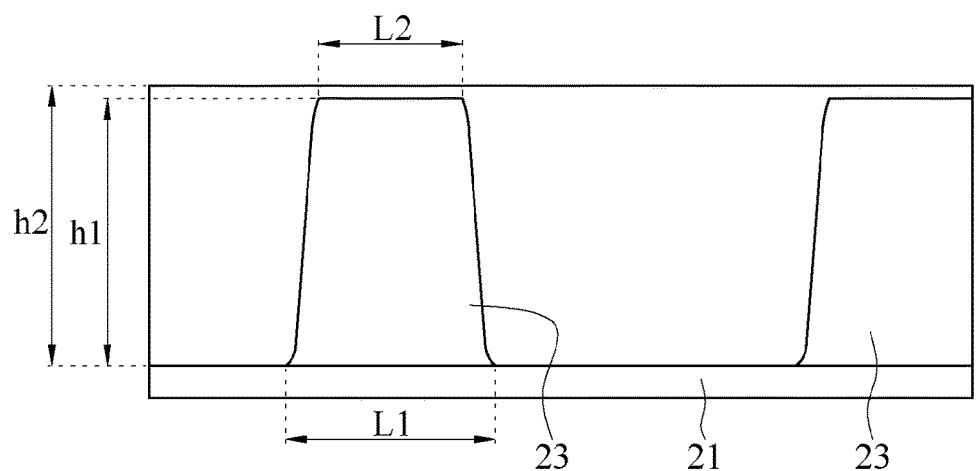
FIG. 3B is an enlarged partial view of the optical sheet in FIG. 1 or FIG. 2.

FIG. 3B is an enlarged partial view of the optical sheet 20 in FIG. 1 or FIG. 2. As shown in FIG. 1, FIG. 2, and FIG. 3B, in some embodiments, the height h1 of the transparent bumps 23 is substantially the same as the height h2 of the photo-excitation layer 25. Herein, the height being substantially the same indicates that a difference between the height h1 of the transparent bumps 23 and the height h2 of the photo-excitation layer 25 is less than 5%, preferably, the height h2 of the photo-excitation layer 25 is slightly higher than the height h1 of the transparent bumps 23. That is, the height h2 of the photo-excitation layer 25 is greater than the height h1 of the transparent bumps 23, but is less than 1.05*h1. It should be noted that in this case, some of the photo-excitation layer 25 may remain on the transparent bumps 23.

In some embodiments, the height of the transparent bumps 23 ranges from 5 to 100 preferably, 30 to 60 µm. In addition, in some embodiments, a tolerance is also allowed between a lower edge length L1 of the transparent bumps 23 and an upper edge length thereof, the edge may be an arc surface or a curved surface, and a junction between the edge and a side surface may be an arc angle.

In some embodiments, as shown in FIG. 1 and FIG. 2, the photo-excitation layer 25 may further include a transparent base material 255, and the first color quantum dots 251 and the second color quantum dots 253 are located inside the transparent base material 255. That is, in the photo-excitation layer 25, the first color quantum dots 251 and the second color quantum dots 253 are encompassed by the transparent base material 255. In some embodiments, the first color quantum dots 251 and the second color quantum dots 253 are dispersed inside the transparent base material 255, and are protected by the transparent base material 255. In some embodiments, the transparent base material 255 includes at least one of acryl and epoxy resin. In some embodiments, in a manufacturing process, a raw material of the transparent base material 255 may be a colloidal fluid, which provides fluidity during coating, and then, is cured in a baking or illuminating manner, so as to form a solid photo-excitation layer 25.

Referring to FIG. 1 and FIG. 2 again, in some embodiments, the optical sheet 20 may further include a protection layer 29. The protection layer 29 is located between the transparent bumps 23 and the photo-excitation layer 25, and the polarizer 27. The protection layer 29 is mainly used to prevent water from entering the photo-excitation layer 25, to prevent the first color quantum dots 251 and the second color quantum dots 253 from being deactivated by moisture. That is, the protection layer 29 covers at least an entire surface, proximal to the polarizer 27, of the transparent bumps 23 and the photo-excitation layer 25. Effects of the protection layer 29 are quantitatively described. In an environment at a temperature of 40° C. and ambient humidity of 90%, moisture that enters the photo-excitation layer 25 every day is, preferably, less than 0.01 g/m². However, no limitation is imposed herein.

Figure 4:
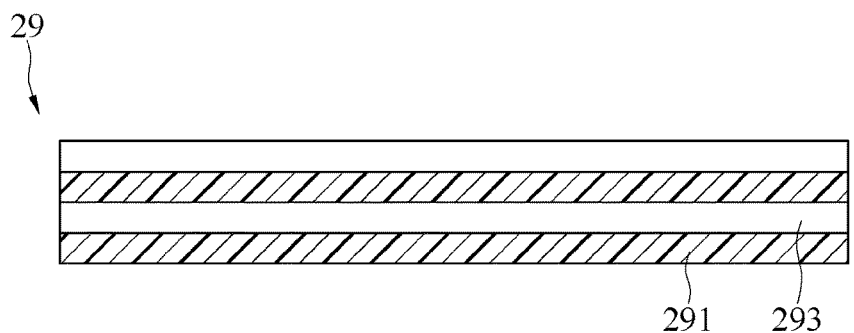
FIG. 4 is a partial sectional view of a protection layer.

FIG. 4 is a partial sectional view of a protection layer. Referring to FIG. 4, in some embodiments, the protection layer 29 includes at least one macromolecular film 291 and at least one silica film 293. The macromolecular film 291 and the silica film 293 may present a mutually stacked multi-layer structure, so as to prevent moisture from directly entering the photo-excitation layer 25 along a defect of a single material by using the design of multi-layer water barriers structure.

In some embodiments, the transparent bumps 23 may form a needed pattern as being coated or transfer-printed onto the substrate 21, and then, be cured in a baking or illumination manner. However, no limitation is imposed herein. Alternatively, the transparent bumps 23 may first be formed in a curing method, and then, be attached to the substrate 21.

Figure 5:
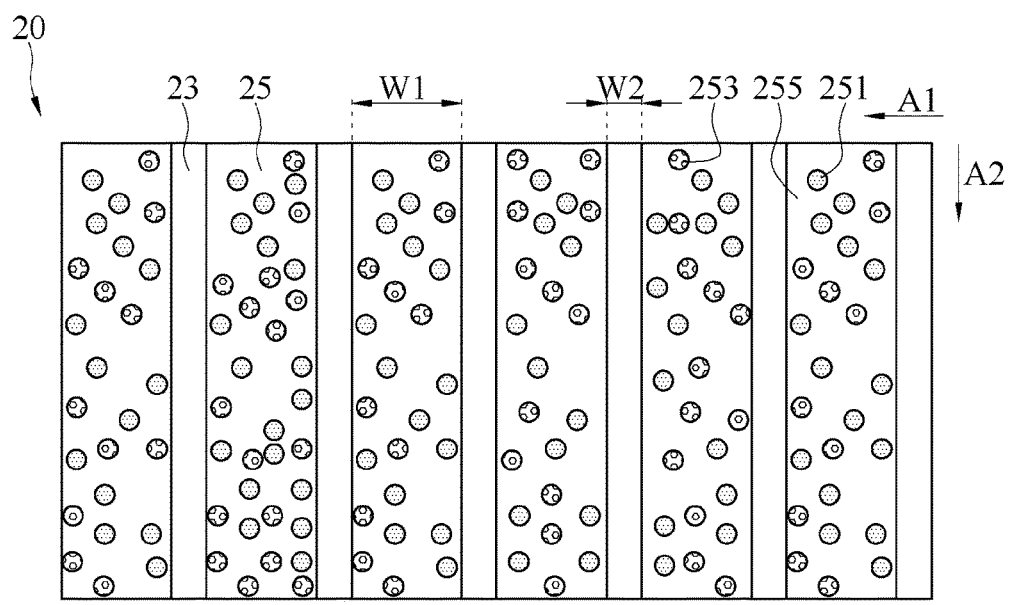
FIG. 5 is a top view of an embodiment of the optical sheet in FIG. 1 or FIG. 2.

FIG. 5 is a top view of an embodiment of the optical sheet 20 in FIG. 1 or FIG. 2. Referring to FIG. 5, in some embodiments, a plurality of transparent bumps 23 is disposed in a first direction A1 on a substrate 21 in a spaced manner. Herein, the transparent bumps 23 are in a long strip shape, and a long axis of the transparent bumps 23 extends along a second direction A2. The first direction A2 intersects with the second direction A2. In some embodiments, in a manufacturing process, transparent bumps 23 may be disposed in advance on the substrate 21 in a spaced, and then, a photo-excitation layer 25 is filled between the transparent bumps 23 in a roller coating method or a spray coating method. In some embodiments, in the first direction A1, a ratio of the first width W1 of the photo-excitation layer 25 between two adjacent transparent bumps 23 to the second width W2 of adjacent transparent bumps 23 may range from 1.5 to 2.5, preferably, 1.7 to 2.3.

Figure 6:
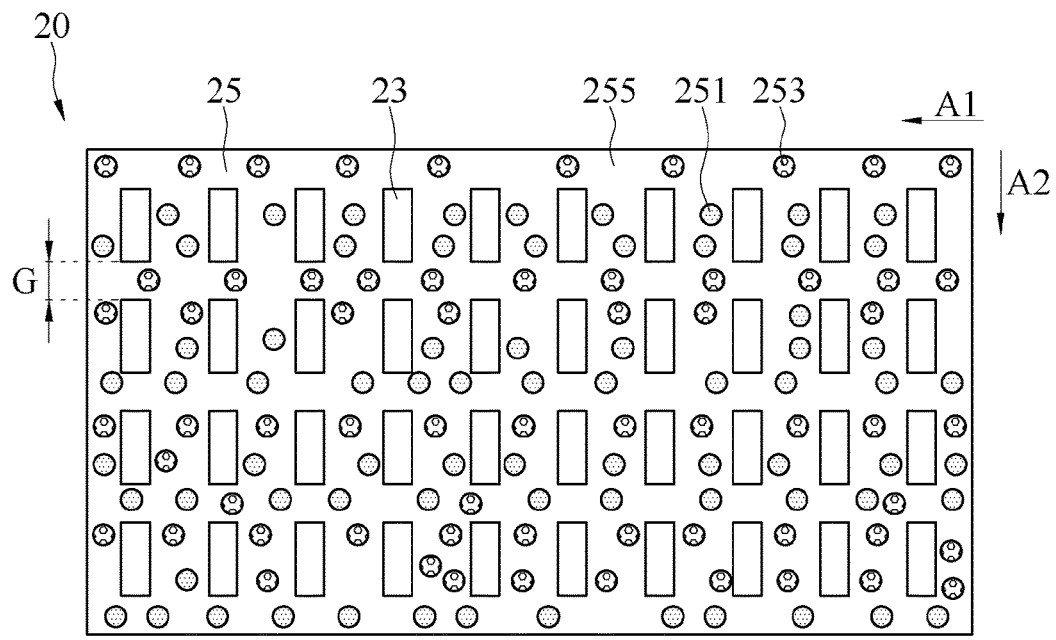
FIG. 6 is a top view of another embodiment of the optical sheet in FIG. 1 or FIG. 2.

FIG. 6 is a top view of another embodiment of the optical sheet 20 in FIG. 1 or FIG. 2. Referring to FIG. 6, in some embodiments, the transparent bumps 23 are disposed in the first direction A1 and the second direction A2 on the substrate 21 in a spaced manner. The first direction A2 intersects with the second direction A2. That is, the transparent bumps 23 are disposed in a matrix shape. For example, the transparent bumps 23 are in a long strip shape and are arranged into at least two columns in the first direction A1 and at least two rows in the second direction A2. There is a gap between adjacent two of the transparent bumps 23 in the same column in the second direction A2, and the gaps G of any two rows correspond to or are aligned with each other in the first direction A1. In some embodiments, the gap ranges from 10 to 20 µm. In some embodiments, in a manufacturing process, when the photo-excitation layer 25 in a fluid state is coated in a roller coating method, a superfluous fluid can enter another space between transparent bumps 23 through the gap G during roller coating, and after being collected on one side, the superfluous fluid is brought out. The roller coating does not need to be performed many times.

Figure 7:
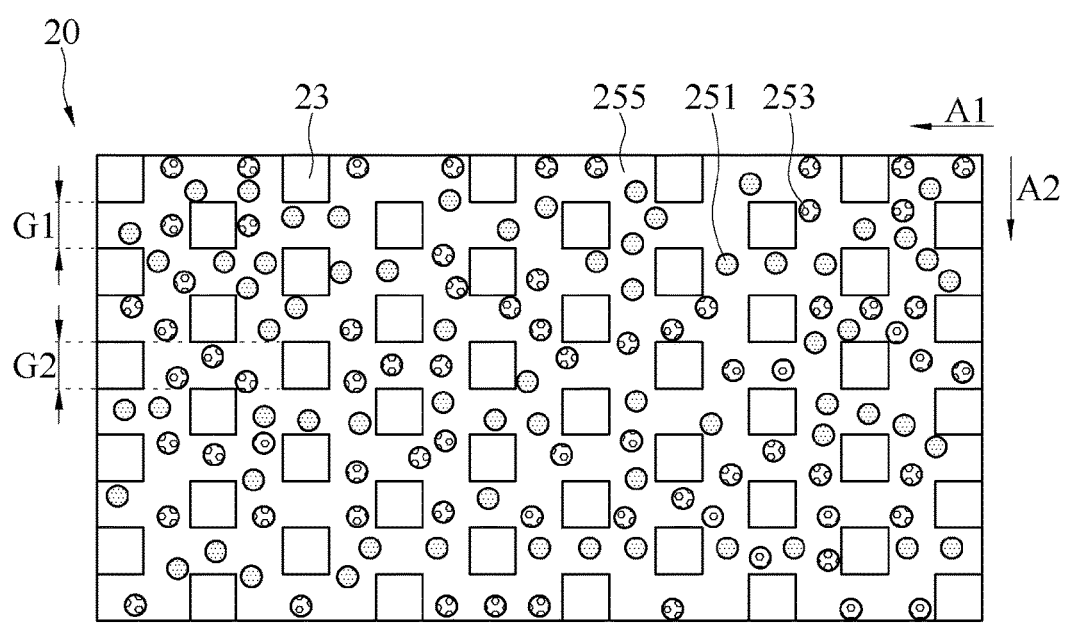
FIG. 7 is a top view of still another embodiment of the optical sheet in FIG. 1 or FIG. 2.

FIG. 7 is a top view of still another embodiment of the optical sheet 20 in FIG. 1 or FIG. 2. Referring to FIG. 7, in some embodiments, in two adjacent columns of transparent bumps 23, a gap G1 in the second direction A2 between transparent bumps 23 of one column of the two adjacent columns and a gap G2 in the second direction A2 between transparent bumps 23 of the other column do not correspond to or align to each other. That is, in any two adjacent columns, gaps G1 and G2 between transparent bumps 23 are distributed in a staggered manner, to improve flowing of the photo-excitation layer 25 in a fluid state during a manufacturing process, so that the roller-coated photo-excitation layer 25 is more uniform. For example, there is a gap G1 between every two of a plurality of transparent bumps 23 located on a first column, and there is a gap G2 between every two of a plurality of transparent bumps 23 located on a second column, and in the first direction A1, the gap G1 and the gap G2 are distributed in a staggered manner.

In some embodiments, as shown in FIG. 1 and FIG. 2, the color filter layer 131 and the pixel array 17 in the display panel 10 are respectively disposed on the first substrate 13 and the second substrate 15. However, in some other embodiments, the color filter layer 131 and the pixel array 17 may both be disposed on the second substrate 15, and the first substrate 13 may only serve as a transparent cover plate, so that a color filter layer or a motor-related chemical material does not need to be taken into consideration, thereby reducing the thickness of the display panel 10.

Figure 8:
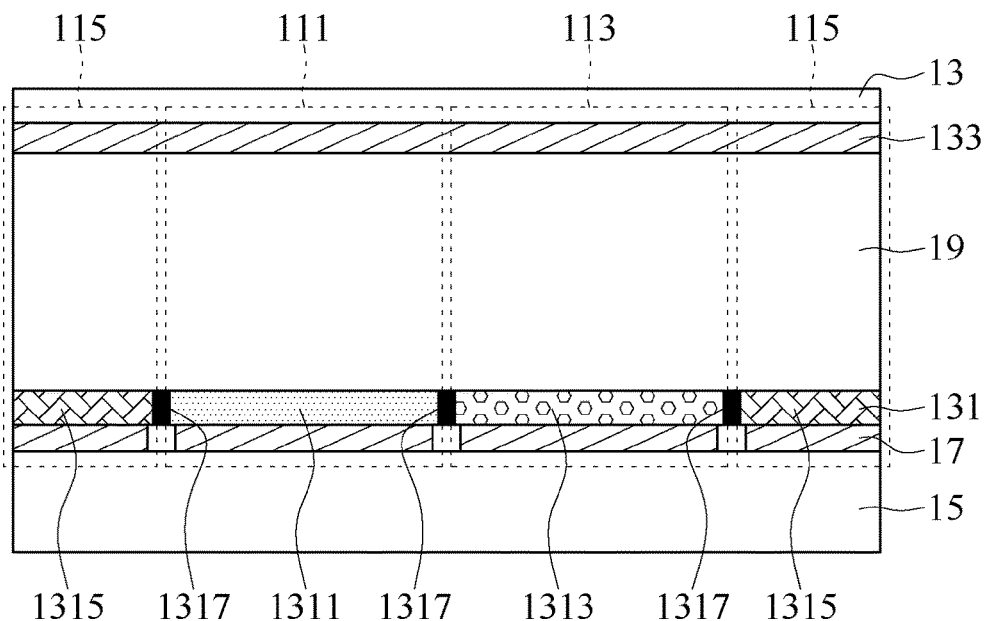
FIG. 8 is a sectional view of another embodiment of the display panel in FIG. 1 or FIG. 2.

FIG. 8 is a sectional view of another embodiment of the display panel 10 in FIG. 1 or FIG. 2. Referring to FIG. 8, both of the color filter layer 131 and the pixel array 17 are disposed on the second substrate 15, and in the first sub-pixels 111, the second sub-pixels 113, and the third sub-pixels 115, the first-color resist layer 1331, the second-color resist layer 1333, and the third-color resist layer 1335 are respectively stacked on the pixel array 17, which is referred to as a Color Filter on Array (COA) structure in which the color filter layer 131 is stacked on the pixel array 17.

Figure 9:
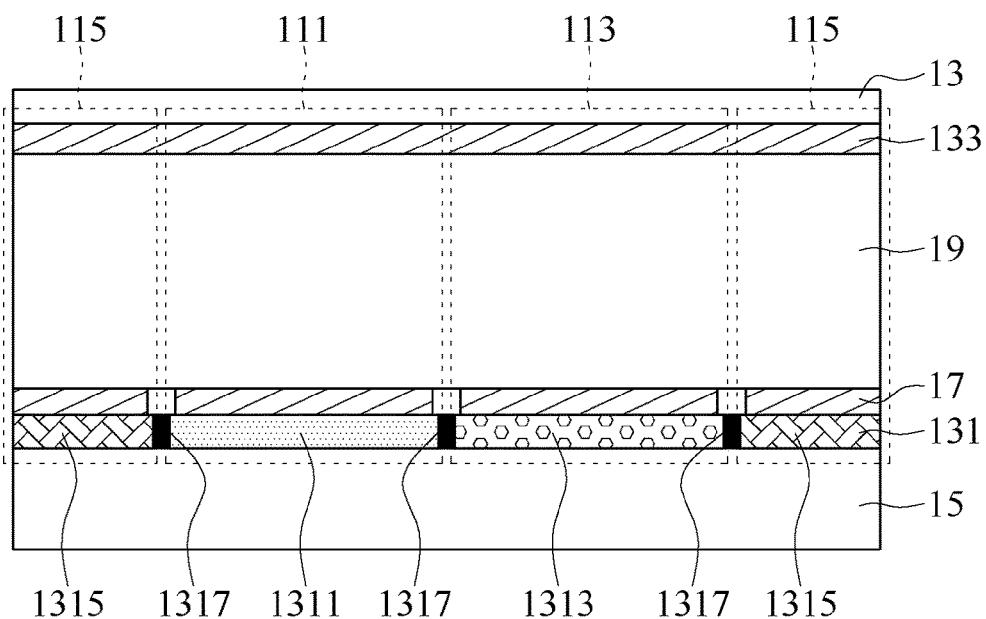
FIG. 9 is a sectional view of still another embodiment of the display panel in FIG. 1 or FIG. 2.

FIG. 9 is a sectional view of still another embodiment of the display panel 10 in FIG. 1 or FIG. 2. Referring to FIG. 9, in the first sub-pixels 111, the second sub-pixels 113, and the third sub-pixels 115, the pixel array 17 is stacked on the first-color resist layer 1331, the second-color resist layer 1333, and the third-color resist layer 1335, which is referred to as an Array on Color Filter (AOC) structure in which the pixel array 17 is stacked on the color filter layer 131.

Herein, for the display panel 10 of the COA structure or the AOC structure, the optical sheet 20 is also disposed at the other side, relative to the liquid crystal layer 19, of the second substrate 15, and is sandwiched between the display panel 10 and backlight module 30. The above is merely an embodiment. However, no substantial limitation is imposed herein. The optical sheet 20 may be applied to various display devices including a color filter layer 131.

In conclusion, according to the display devices 1 and 2 and the optical sheet 20 used in same in any embodiment of the present invention, a photo-excitation layer 25 including first color quantum dots 251 and second color quantum dots 253 is designed in the optical sheet 20 thereof, and first color light and second color light that are generated by exciting the first color quantum dots 251 and the second color quantum dots 253 by light are provided to first color sub-pixels 111 and second color sub-pixels 113, so as to improve light emission efficiency and chroma of the display devices 1 and 2, thereby further achieving a power-saving function. Upon actual testing, the overall light emission efficiency may achieve 6% to 15%, and the corresponding chroma may achieve 95% to 115% of the NTSC. Obviously, both of the 1 light emission efficiency and the chroma are effectively improved as compared with a relatively conventional liquid crystal display device.

Although preferred embodiments of the present invention are disclosed as above, they are not intended to limit the present invention. Any person skilled in the art may make some variations or modifications without departing from the scope of the present invention. Therefore, the protection scope of the present invention shall be subject to the protection scope of the appended claims.

What is claimed is:

1. A display device, comprising:
    a display panel, comprising a plurality of first-color sub-pixels, a plurality of second-color sub-pixels, and a plurality of third-color sub-pixels;
    a backlight module, comprising a blue light source;
    an optical sheet, located between the display panel and the backlight module, wherein the optical sheet comprises:
        a substrate;
        a plurality of transparent bumps, disposed on the substrate in a spaced manner, and each of the transparent bumps is overlapped with one of the third-color sub-pixels in a vertical projecting direction of the substrate; and
        a photo-excitation layer, located on the substrate and located between the transparent bumps, wherein the photo-excitation layer comprises a plurality of first photo-excitation regions and a plurality of second photo-excitation regions, each of the first photo-excitation regions is overlapped with one of the first-color sub-pixels in the vertical projecting direction, each of the second photo-excitation regions is overlapped with one of the second-color sub-pixels in the vertical projecting direction, and each of the first photo-excitation regions and the second photo-excitation regions comprises a plurality of first-color quantum dots and a plurality of second-color quantum dots; and
    a polarizer, located between the display panel and the optical sheet.

2. The display device according to claim 1, wherein the optical sheet further comprises a protection layer, wherein the protection layer is located between the transparent bumps and the photo-excitation layer, and the polarizer.

3. The display device according to claim 1, wherein the backlight module further comprises a yellow light source.

4. The display device according to claim 3, wherein the yellow light source comprises at least one yellow light-emitting diode, the blue light source comprises a plurality of blue light-emitting diodes, and a ratio of a number of the blue light-emitting diodes to a number of the yellow light-emitting diodes ranges from 2 to 20.

5. The display device according to claim 1, wherein the area of each of the transparent bumps is greater than or equal to the area of the third sub-pixel.

6. The display device according to claim 1, wherein the transparent bumps are disposed in a first direction on the substrate in a spaced manner.

7. The display device according to claim 6, wherein in the first direction, a ratio of a width of the photo-excitation layer between two adjacent transparent bumps in the first direction to a width of the adjacent transparent bumps ranges from 1.5 to 2.5.

8. The display device according to claim 1, wherein the transparent bumps are disposed in a first direction and a second direction on the substrate in a spaced manner, the first direction intersects with the second direction, and in the second direction, there is a gap between two adjacent transparent bumps in the transparent bumps.

9. The display device according to claim 8, wherein on two adjacent columns of the transparent bumps arranged in the second direction, the gaps of the two adjacent columns do not align to each other in the first direction.

10. The display device according to claim 1, wherein a height of the transparent bumps is substantially the same as a height of the photo-excitation layer.

11. The display device according to claim 1, wherein the transparent bumps do not have the first-color quantum dots or the second-color quantum dots.

12. The display device according to claim 1, wherein the light excitation layer comprises a transparent base material, and the first-color quantum dots and the second-color quantum dots are encompassed in the transparent base material.

13. The display device according to claim 1, wherein a height of the transparent bumps ranges from 5 to 100 μm.

* * * * *